UNITED STATES PATENT OFFICE.

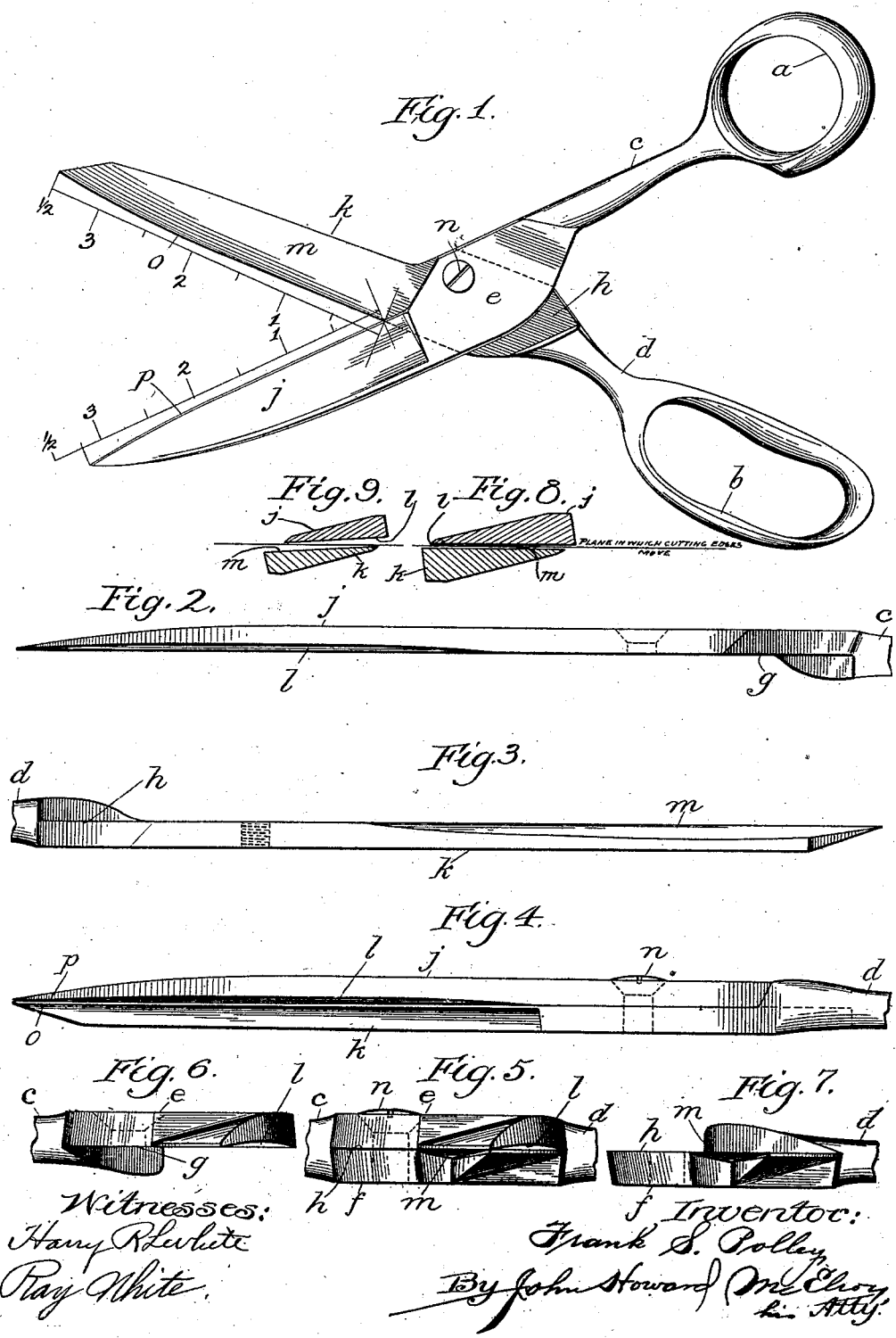

FRANK S. POLLEY, OF CHICAGO, ILLINOIS, ASSIGNOR, BY MESNE ASSIGNMENTS, TO SLIDING BLADE SHEAR COMPANY, OF CHICAGO, ILLINOIS, A CORPORATION OF ILLINOIS.

SLIDE-CUT SHEARS.

No. 915,697.      Specification of Letters Patent.      Patented March 16, 1909.

Application filed December 26, 1905, Serial No. 293,197. Renewed November 10, 1908. Serial No. 461,960.

*To all whom it may concern:*

Be it known that I, FRANK S. POLLEY, a citizen of the United States, residing at Chicago, in the county of Cook and State of Illinois, have invented certain new and useful Improvements in Slide-Cut Shears, of which the following is a specification.

My invention relates to what are known as slide-cut shears and the object of the invention is to produce shears of this character capable of cutting all kinds of goods with ease, evenness and certainty, and at the same time retaining the keenness of their edges for a long period. To this end, in carrying out my invention, I shape the adjacent surfaces of the blades so that they stand at an angle with reference to the plane in which their cutting edges move, and construct the blades and their connection so that they give a slide or draw cut relative to each other as they are brought together, and also make the pivotal connections loose so that they will not hold the cutting edges in contact so as to cut and dull each other. In addition I prefer to form the cutting edges of the shear blades in a slightly convex curve from their heels to the points.

In the accompanying drawings, which show the preferred embodiment of the invention, Figure 1 is a side elevation of a pair of shears containing my improvements, with the blades open. Fig. 2 is a back-edge view, on an enlarged scale, of the bottom blade. Fig. 3 is a similar view of the top blade. Fig. 4 is an edge elevation of the shears with their blades closed so as to show the "day-light" between the blades, Fig. 5 is an end view, on an enlarged scale looking toward the points of the blades which are shown as closed together, Fig. 6 is a similar view of the top blade, Fig. 7 is a similar view of the bottom blade, Fig. 8 is a transverse section through the blades adjacent the heel ends thereof, and Fig. 9 is a similar section adjacent the point end.

In carrying out my invention I form the shears with handles or thumb and finger holds $a$ and $b$, shanks $c$ and $d$, plate-like extensions $e$ and $f$, and blades $j$ and $k$. The blades are loosely connected by a pivot screw $n$. The extensions $e$ and $f$ have rides or bearing surfaces $g$ and $h$, but the latter are not relied upon to keep the cutting edges of the blades in contact throughout the cutting stroke, the pivotal connection between the blades not being tight enough to secure this result from the action of the rides. As a preferred means of producing endwise sliding of the blades in relation to each other to secure the slide or draw cut, I offset the blades $j$ and $k$ with respect to the pivot screw $n$ so that they extend forward from a location on the lower part of the extensions $e$ and $f$ as shown. The location of the pivot screw $n$ and the relation of the blades as shown are such that the cutting edge of one of the blades and the back edge of the other are substantially in a line extending through the pivot, but it will be understood that this precise relation is not essential. Such shaping of the blades and the eccentric or off-set location of the pivot results in the cutting edges of the blades being given a draw cut, which is characterized by well known advantages as compared with the cut of the ordinary swinging blade.

The inner or adjacent surfaces $l$ and $m$ of the top and bottom blades, respectively, are beveled or inclined transversely at an angle to the plane in which their cutting edges move, as will be clearly seen on reference to the drawings. This beveling of the inner faces of the blades may be produced in different ways and may be varied within certain limits, but in practice I find it convenient to form the blades so that the angle, between their inner faces and the plane in which the cutting edges move, increases somewhat from the heels of the blades to their points. Thus, near the heels of the blades, as shown in Fig. 8, the angle between the surface $l$ or $m$ and the plane in which the cutting edges move is very slight, the surface $l$ and $m$ at this point being in fact practically parallel and in contact. Nearer the points of the blades, as seen in Fig. 9, the angle is increased considerably, and while the surfaces $l$ and $m$ at this point are at a considerable angle to the plane in which the cutting edges move, they are still substantially parallel, and if the blades are brought together, they must necessarily be separated by considerable space as only the edges are in the plane referred to. This peculiar shape of the adjacent surface of the blades may be produced either by twisting the blades bodily or by grinding bevels on the adjacent faces of the blades, or by both twisting the blades and grinding them. The space or opening which is thus made between the blades is known as "day-light" when the blades are closed as shown in Fig. 4. By giving the adjacent surface of the blades this beveled conformation, the cutting edges are left free to move in proper working contact or proximity throughout their length without the necessity of positively forcing them together, and by combining this construction with the slide or draw cut, the shearing action is effected with such ease that it is entirely practical to provide a pivotal connection that is quite loose in all the working positions of the blades. The pivot n being formed and adjusted so as not to hold the cutting edges of the blades in cutting contact, as has heretofore been considered essential, there is less friction between the cutting edges of the blades and they do not cut or chafe each other as in the case of the ordinary construction, so that as a result the shears can be worked much more easily than in the case of the ordinary construction, and they will also retain the keenness of their edges for a much longer period.

While I preferably apply the twisting of the blade surface and the curving of the cutting edges to both blades, it will be apparent that I might apply these features to but only one of the blades, or that I might twist the adjacent surface of but one blade and curve the cutting edge of the other.

As previously stated, I prefer to form the blades with the angle between the adjacent surfaces and the plane in which the cutting edges move increasing from the heels to the points of the blades, but it will be understood that this preference arises primarily from convenience of manufacture and is not necessary. It is clear, for example, that if the angle of the blades were made uniform rather than increasing from their heels to the points, the blades would still come into contact with each other only at their cutting edges. The essential thing is that the inner faces of the blades shall not come into positive engagement with each other in such a way that the cutting edges would not be free to come into contact or working proximity with each other when the blades are opened and closed. This result can be obtained if the angle of the blades is uniform, as stated, and the angle may be very slight indeed, if the shears are well constructed. In this connection I would call attention to the fact that for clearness of illustration the degree of the angularity of the blades and the increase of the angularity from heel to point is considerably exaggerated in the drawings.

I have shown my invention as applied to shears, but it is obvious that it is also applicable to scissors.

What I claim is:—

1. In a pair of slide cut shears, the combination with the pair of blades of which one has its inner surface formed upon a curve having its transverse angle to the plane in which the cutting edges move increasing from its heel to its point, of means forming a loose pivotal connection between said blades.

2. In a pair of slide cut shears, the combination with the pair of blades of which one has its inner surface formed upon a curve having its transverse angle to the plane in which the cutting edges move increasing from its heel to its point and its cutting edge formed in a slightly convex curve from its heel to its point, of means forming a loose pivotal connection between said blades.

3. In a pair of slide cut shears, the combination with the pair of blades having their inner adjacent surfaces formed upon curves having their transverse angles to the plane in which the cutting edges move increasing from their heels to their points, of means forming a loose pivotal connection between said blades.

4. In a pair of slide cut shears, the combination with the pair of blades having their inner adjacent surfaces formed upon curves having their transverse angles to the plane in which the cutting edges move increasing from their heels to their points and their cutting edges formed on a slightly convex curve from their heels to their points, of means forming a loose pivotal connection between said blades.

5. In a pair of shears, the combination with the blades of which one has its inner surface formed upon a curve having its transverse angle to the plane in which the cutting edges move increasing from its heel to its point, of means loosely connecting said blades comprising a pivot pin offset from the longitudinal center lines of the blades.

6. In a pair of shears, the combination with the blades of which one has its inner surface formed on a curve having its transverse angle to the plane in which the cutting edges move increasing from its heel to its point and its cutting edges formed upon a slightly convex curve from its heel to its point, of means loosely connecting said blades comprising a pivot pin offset from the longitudinal center lines of the blades.

7. In a pair of shears, the combination with the blades having their inner adjacent surfaces formed upon curves having their transverse angles to the plane in which the cutting edges move increasing from their heels to their points, of means loosely connecting said blades comprising a pivot pin offset from the longitudinal center lines of the blades.

8. In a pair of shears, the combination with the blades having their inner adjacent surfaces formed upon curves having their transverse angles to the plane in which the cutting edges move increasing from their heels to their points and having their cutting edges formed on slightly convex curves from their heels to their points, of means loosely connecting said blades comprising a pivot pin offset from the longitudinal center lines of the blades.

9. In a pair of shears, the combination with the blades of which one has its inner surface beveled or inclined transversely at an angle to the plane in which the cutting edges of the blades move, of means loosely connecting said blades comprising a pivot pin offset from the longitudinal center lines of the blades.

10. In a pair of shears, the combination with the blades of which one has its inner surface beveled or inclined transversely at an angle to the plane in which the cutting edges of the blades move and its cutting edge formed on a slightly convex curve, of means loosely connecting said blades comprising a pivot pin offset from the longitudinal center lines of the blades.

11. In a pair of shears, the combination with the blades having their inner adjacent surfaces beveled or inclined transversely at an angle to the plane in which the cutting edges of the blades move, of means loosely connecting the blades comprising a pivot pin offset from the longitudinal center lines of the blades.

12. In a pair of shears, the combination of the blades having their inner adjacent surfaces beveled or inclined transversely at an angle to the plane in which the cutting edges move and their cutting edges formed upon slightly convex curves, of means loosely connecting the blades comprising the pivot pin offset from the longitudinal center lines of the blades.

13. In a pair of shears, the combination with the blades having their inner adjacent faces lying each wholly on one side of the plane in which the cutting edges move, of means loosely connecting the blades comprising a pivot pin offset from the longitudinal center lines of the blades.

In witness whereof, I have hereunto set my hand, and affixed my seal, this 23rd day of December, 1905.

FRANK S. POLLEY. [L. S.]

In the presence of witnesses:
HARVEY L. HOPKINS,
JOHN HOWARD MCELROY.